United States Patent
McIntyre

(10) Patent No.: US 12,181,186 B2
(45) Date of Patent: Dec. 31, 2024

(54) FRACTURING HOT ROCK

(71) Applicant: Jack McIntyre, San Angelo, TX (US)

(72) Inventor: Jack McIntyre, San Angelo, TX (US)

( * ) Notice: Subject to any disclaimer, the term of this patent is extended or adjusted under 35 U.S.C. 154(b) by 0 days.

(21) Appl. No.: 17/970,845

(22) Filed: Oct. 21, 2022

(65) Prior Publication Data
US 2023/0130169 A1 Apr. 27, 2023

Related U.S. Application Data

(60) Provisional application No. 63/272,094, filed on Oct. 26, 2021.

(51) Int. Cl.
*F24T 10/20* (2018.01)
*E21B 43/26* (2006.01)
*E21B 43/28* (2006.01)

(52) U.S. Cl.
CPC .............. *F24T 10/20* (2018.05); *E21B 43/26* (2013.01); *E21B 43/283* (2013.01)

(58) Field of Classification Search
CPC .................................................... E21B 43/238
USPC ....................................................... 166/308.1
See application file for complete search history.

(56) References Cited

U.S. PATENT DOCUMENTS

| | | | |
|---|---|---|---|
| 11,542,815 B2* | 1/2023 | Hull | E21B 47/10 |
| 2012/0199354 A1* | 8/2012 | Kaminsky | F03G 7/04 |
| | | | 166/57 |
| 2013/0068462 A1 | 3/2013 | Pantano | |
| 2015/0129209 A1* | 5/2015 | Kelemen | E21B 43/164 |
| | | | 166/300 |
| 2015/0300237 A1* | 10/2015 | Mcleod-Ross | B63H 21/14 |
| | | | 165/41 |
| 2015/0300327 A1* | 10/2015 | Sweatman | F24T 10/20 |
| | | | 60/641.2 |
| 2016/0076351 A1* | 3/2016 | Stehle | E21B 43/247 |
| | | | 166/280.2 |
| 2016/0281482 A1 | 9/2016 | Nguyen et al. | |
| 2019/0390660 A1* | 12/2019 | McBay | F24T 10/20 |
| 2021/0003320 A1* | 1/2021 | Toews | E21B 43/30 |

OTHER PUBLICATIONS

International Search Report from PCT/US2022/47743 dated Dec. 21, 2022, 2 pages.
Written Opinion for PCT/US2022/47743 dated Dec. 21, 2022, 4 pages.
International Preliminary Report On Patentability from related PCT application PCT/US2022/047743, dated May 30, 2024, 13 pages.

* cited by examiner

*Primary Examiner* — Matthew R Buck
*Assistant Examiner* — Douglas S Wood
(74) *Attorney, Agent, or Firm* — Braxton Perrone, PLLC; Bobby W. Braxton; Gregory Perrone

(57) ABSTRACT

A system and method for harnessing geothermal energy using fracturing of hot rock. The system has at least a first well and a second well. The method involves introducing an alkali metal downhole in a first well. A solution is also introduced into the first well. The solution produces an exothermic reaction with the alkali metal. The gas and heat fracture the hot rock producing fractures. The fractures fluidly connects the first well to the second well. A solution, such as water, can be pumped through the first well, through the fractures, and into the second well. The hot rock passes geothermal energy to the water which can then be utilized.

14 Claims, 5 Drawing Sheets

FRACTURING HOT ROCK

PRIORITY

The present invention claims priority to U.S. Provisional Application No. 63/272,094 filed Oct. 26, 2021, the entirety of which is hereby incorporated by reference.

BACKGROUND OF THE INVENTION

Technical Field

The present invention relates to a system and method for fracturing hot rocks via a chemical reaction.

Description of Related Art

Geothermal energy is a renewable energy source which can be used for a variety of purposes. Consequently, there is a need to harness geothermal energy.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
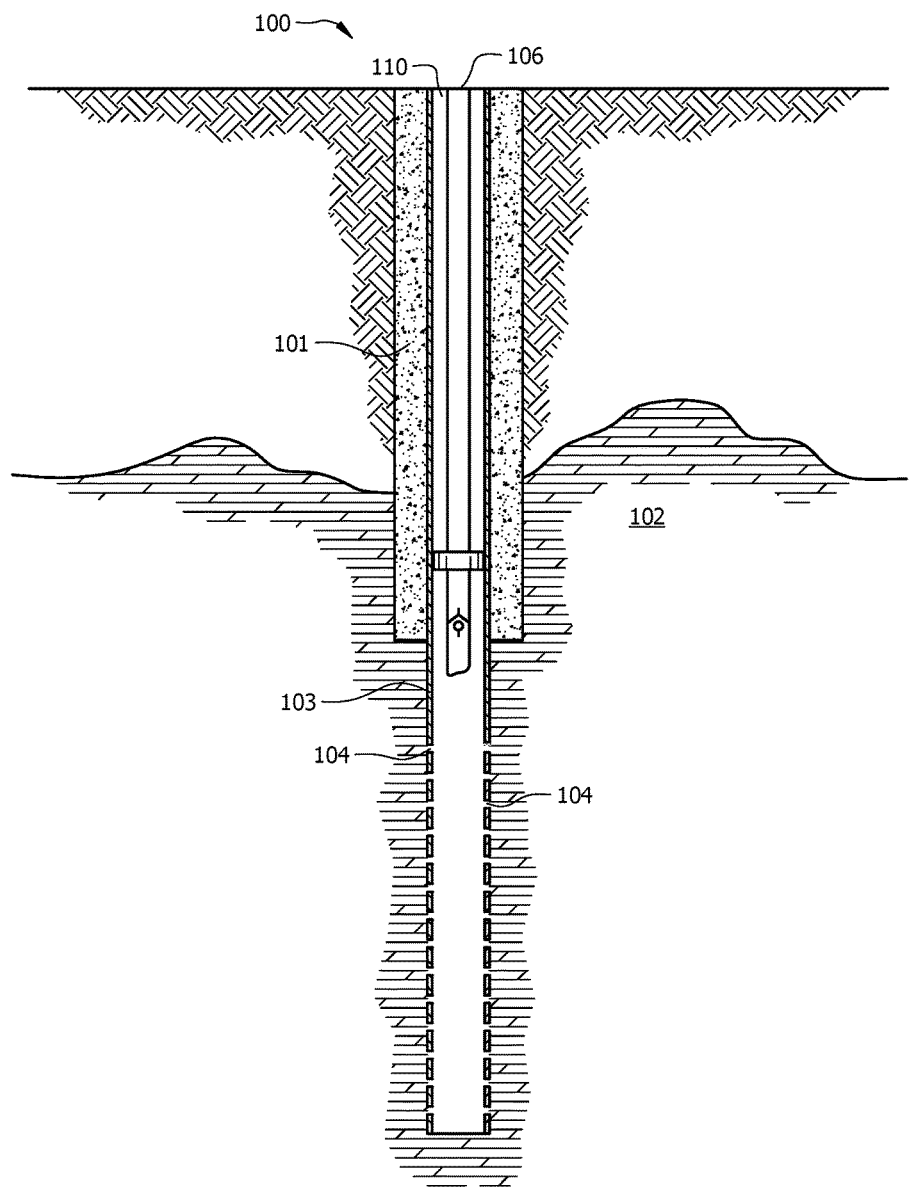
FIG. 1 is a schematic of a well in one embodiment.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Hot, dry rock geothermal potential has unlimited growth in almost any area. If drilling deep wells into basement rock that contains high temperatures can be fractured successfully, this will create a manmade reservoir system designed for heat extraction. Hydraulically fracturing hard brittle rocks such as granites are challenging. Communication between displaced wells have problems with hydraulic fracturing systems because of lack of communication between wellbores. While an embodiment will be described in reference to granite, this is for illustrative purposes only and should not be deemed limiting. Hot rock can include granite, as well as hard minerals comprised of intrusive, igneous rock rich in feldspar and quartz formed from magma. Hot rock also includes hard brittle crystalline rocks that are encountered at depth that is hot enough to create thermal energy from water injected into it.

In one embodiment the hot rock is fractured chemically. In one such embodiment the hot rock is fractured with a reaction of a solution, such as water, and an alkali metal, such as sodium. In one embodiment the solution comprises aqueous sodium. Completing the granite fracture system chemically primarily with alkali metals has several options. In one embodiment the wellbores are drilled and cased with cement some distance below the top of the granite. This isolates all potential water bearing zones in sedimentary rocks above and leaves the bottom of the well within the hot dry rock, dry of water. Once this is completed the well can either be perforated if cased by conventional or propellant methods to optionally enhance the fracture reaction directionally, or if open hole the alkali metal such as sodium can then be run as a fluid when mixed with ammonia and then can be used for hydro fracturing the hot, dry rock. Alternately the lower part of the well can simply be loaded with the alkali metal before equipment is set in the well for final completion. A sealing method such as down hole high pressure, high temperature packer systems, high pressure flow systems, near the packer system, and equipment for pressure monitoring and isolation purposes should be used. Reaction energy can be controlled by the amount of metal and volume of water pumped down. Reaction energy can be calculated by volume of reactant, hole size, depth, rock type, rock temperatures, pressures and other such factors.

In one embodiment the goal is to create the highest energy and fracture intensity from the reaction to fracture the rock progressively, and communicate two or several wellbores, where water can later be pumped down one or more wellbores, heated and recovered from other wellbores as heat energy extraction. This is discussed in more detail with reference to the figures below herein.

In some embodiments, control of reaction energy is critical for this system to be safely implemented. Sodium metal and water can react violently creating extreme heat and hydrogen gas. Use of specific packer and flow systems designed with high strength, heat resistant elements can be used where equipment is in contact with the chemical reaction. Dual tubing systems could also be used to monitor pressure and temperatures. Both vertical and horizontal wells can be used for both injection and/or recovery wells. Thus, while vertical wells are depicted in the figures, this is for illustrative purposes only and should not be deemed limiting.

The wells can be fractured with liquid ammonia, ammonia alkali metal mixtures or non-reactive gases or oil-based fluids, and combinations thereof. Wells can be drilled into the hot, dry rock section with air or non-reactive fluid. In one embodiment a horizontal wellbore can be filled with chemical and several horizontal wells that were drilled around parallel to the center well and water pumped into the center well for the chemical reaction would fracture the rock in a radial configuration and therefore communicate all wellbores in a radial fractured envelope. The reaction well and recovery wells can be designed for the most efficient configuration.

Fracturing dry rocks with hydraulics have been complicated and inefficient for this type of rocks. Communication of the fracture system between the injection wells and recovery wells have been inconsistent with dry crystalline rock with fracture physics not always performing as designed. Hard, brittle rocks seem to fracture much differently than softer rocks such as shale. Accordingly, in one embodiment this system affords a much more consistent, attainable communicative network of fractures within this type of rock system.

FIG. 1 is a schematic of a well in one embodiment. The well 101 can comprise virtually any well known in the art. As depicted the well 101 comprises an inner well 106 and an outer well 110. Material can be pumped down the inner well 106 and retrieved out from the outer well 110 and vice versa.

The hot rock 102 can comprise any hot rock 102 discussed above. As noted, in one embodiment the hot rock 102 comprises granite.

As shown, at least part of the well 101 extends down into the hot rock 102 zone. This portion of the well 101 which extends into the hot rock 102 is referred to as the outlet portion 103. As depicted the outlet portion 103 comprises perforations 104 or openings which allows liquid and gas from the well 101 to extend into the hot rock 102. The outlet portion 103 can also have an open end from which material can be deposited.

Figure 2:
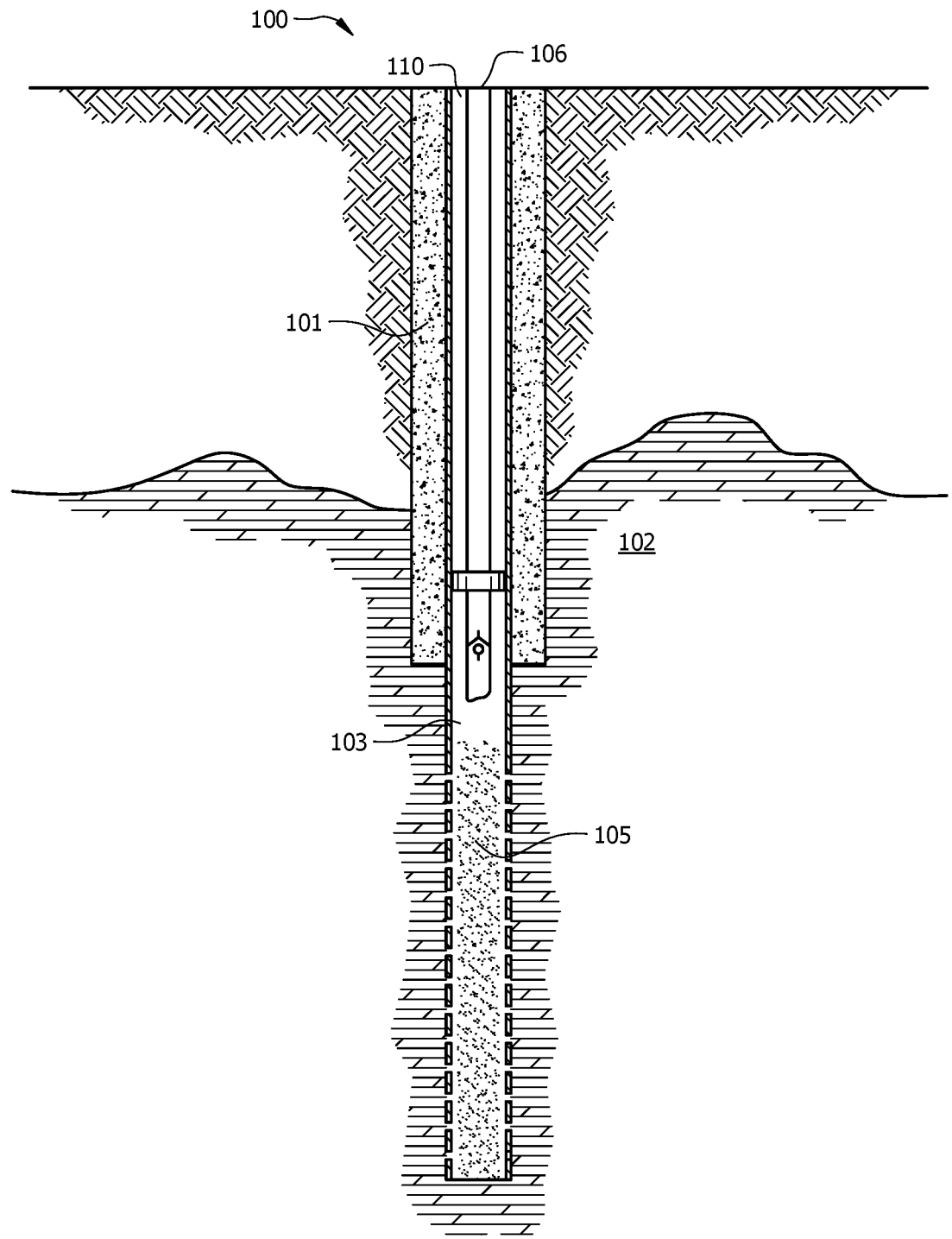
FIG. 2 is a schematic of a well with an alkali in one embodiment.

FIG. 2 is a schematic of a well with an alkali in one embodiment. As shown, an alkali metal 105 has been deposited into the outlet portion. The alkali metal 105 can be deposited in virtually any form. It can be a slurry, chips, metallic form, etc. As noted above, in one embodiment the alkali is sodium and it is mixed with ammonia to form a liquid slurry which can be pumped downhole. Whatever the form, the alkali metal 105 is deposited into the outlet portion. As noted above, in some embodiments the alkali metal 105 can be placed downhole during drilling or after drilling.

In one embodiment, the alkali metal 105 which has been deposited into the outlet portion 103 is kept separate from the other reactant, such as water. This ensures the reaction only occurs at the desired time and location.

Figure 3:
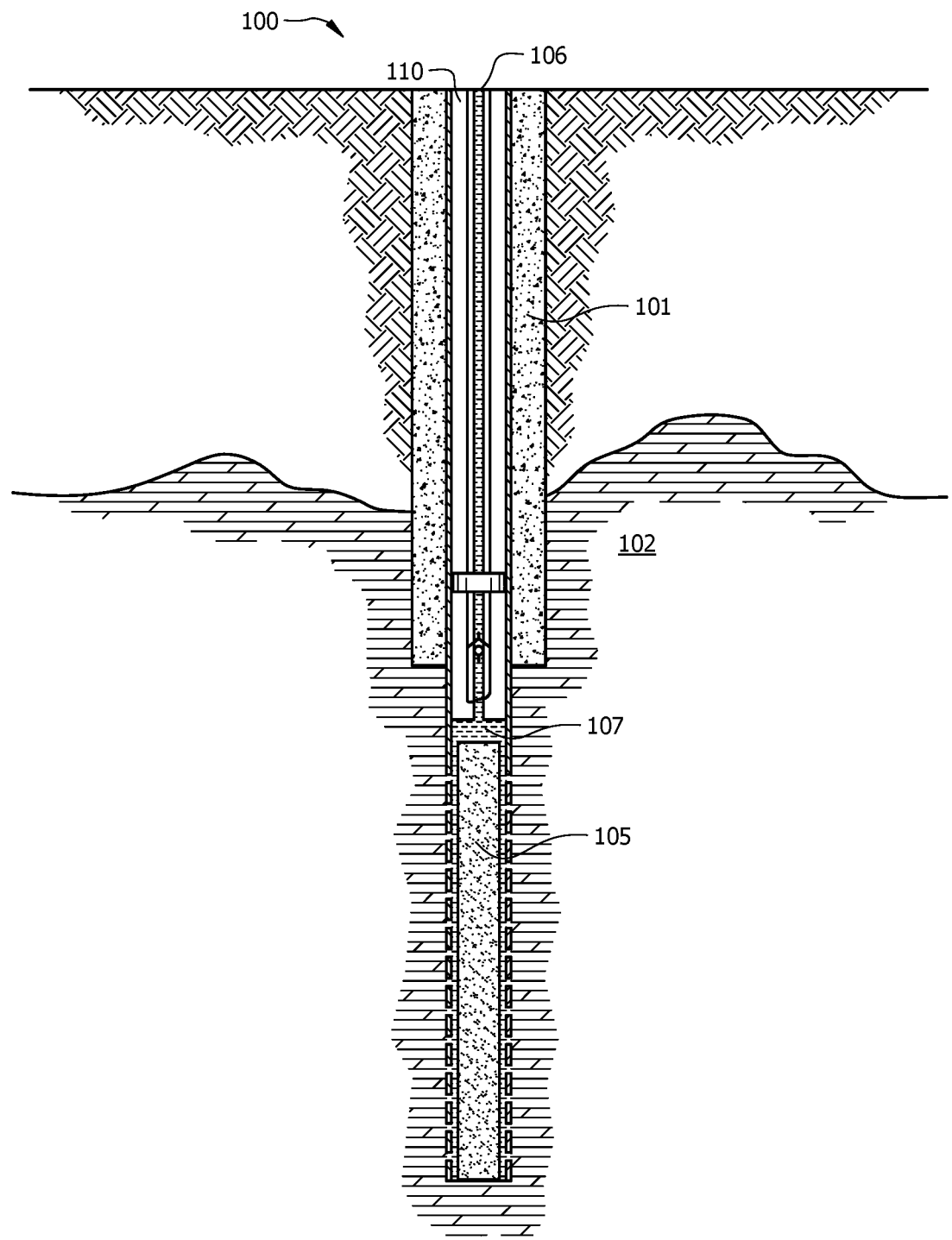
FIG. 3 is a schematic of a well introducing water in one embodiment.

FIG. 3 is a schematic of a well introducing water in one embodiment. As shown water is pumped through the inner well 106 down into the outlet portion 103. This allows the solution 107, in some embodiments water, to react with the alkali metal 105. As noted, the solution 107 can vary depending upon the alkali metal 105 and the desired reaction. In one embodiment the solution 107 comprises water.

One example of the reactions which can be utilized, as discussed above, is the reaction of sodium with water. Sodium is relatively inexpensive, and the water is often readily available for pumping. Consequently, the reaction is initiated by bringing sodium into the presence of water.

There are a variety of chemical reactions which can be utilized to provide the heat and gas needed to fracture the dry rock. One example will be discussed herein using sodium. However, this is for illustrative purposes only and should not be deemed limiting. Sodium, potassium, and other reactive elements can also be utilized. Virtually any reaction which is exothermic can be utilized, however, there are environmental impact consequences which must be considered. In one embodiment any reactant which is exothermic with water can be utilized.

Additionally, while sodium metal is discussed, this is likewise for illustrative purposes only and should not be deemed limiting. In other embodiments, as noted, the sodium is delivered in a solution or slurry. As but one example, the sodium can be in a solution with ammonia. Such an aqueous solution provides for an easier delivery medium. Further, sodium in solution, in some embodiments, is easier to transport and handle compared to metallic sodium.

Sodium is a metal which reacts with water. When it reacts with water, it can follow one of the two following reactions:

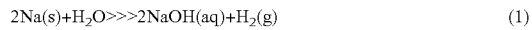

$$2Na(s)+H_2O \ggg 2NaOH(aq)+H_2(g) \quad (1)$$

$$2Na(s)+H_2O \ggg Na_2O+H_2(g) \quad (2)$$

If excess water is found, then reaction (1) typically follows. In reaction (1) sodium metal reacts rapidly with excess water to form sodium hydroxide and hydrogen gas. The sodium hydroxide is a colorless solution. As noted, the reaction is exothermic. Significant heat is released by this reaction.

Sodium hydroxide reacts in water to separate into sodium ions and negatively charged hydroxide ions. This reaction is also exothermic.

If excess sodium is found, then the reaction (2) occurs whereby sodium monoxide and hydrogen gas are produced. Sodium monoxide reacts with water to produce sodium hydroxide, and that reaction is also exothermic.

As can be seen, the reaction of sodium metal and water results, generally, in sodium hydroxide, hydrogen gas, and heat. The heat and gas produced expands to fracture the rocks.

Hydrogen gas can react violently with oxygen and heat. Such a reaction causes an increase in temperature and pressure. The explosion of the hydrogen gas creates further fractures in the dry rocks. Thus, to the extent oxygen is available to the hydrogen gas, this reaction can cause an explosion.

Sodium reacts with water at very high temperatures due to the exothermic nature of the reaction. Consequently, in one embodiment a portion of the well 101 comprises materials designed to withstand the high reaction temperatures. As an example, in one embodiment portions of the outlet portions 103 can comprise ceramic or other materials which allow the tip to withstand the 1,000° C. associated with the reaction.

It should be noted that while FIG. 3 shows the solution 107 being delivered to the alkali metal, in other embodiments, the alkali metal 105 can be delivered to formations which already have solution 107, such as water. In such embodiments the alkali metal 105 reacts with the pre-existing pools or formations of water.

Figure 4:
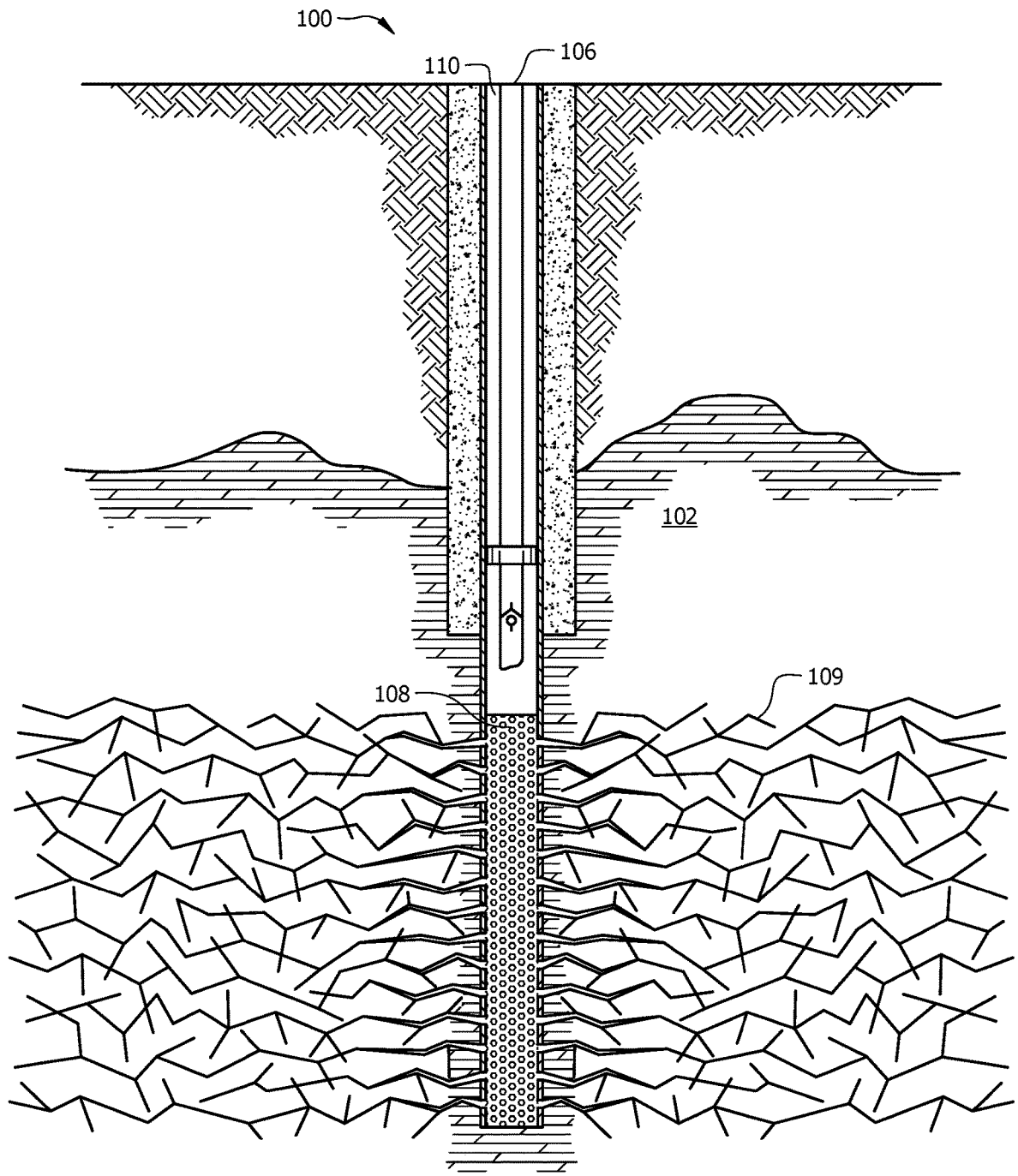
FIG. 4 is a schematic of a well during the reaction in one embodiment.

FIG. 4 is a schematic of a well during the reaction in one embodiment. The resulting reaction 108, generally hot gas, expands into the dry rock, fracturing the rock in the process. The fractures 109 provide places for the solution, such as water, to travel into the hot dry rock and initiate heat transfer. The fracturing process can be repeated until sufficient fractures have been created.

Figure 5:
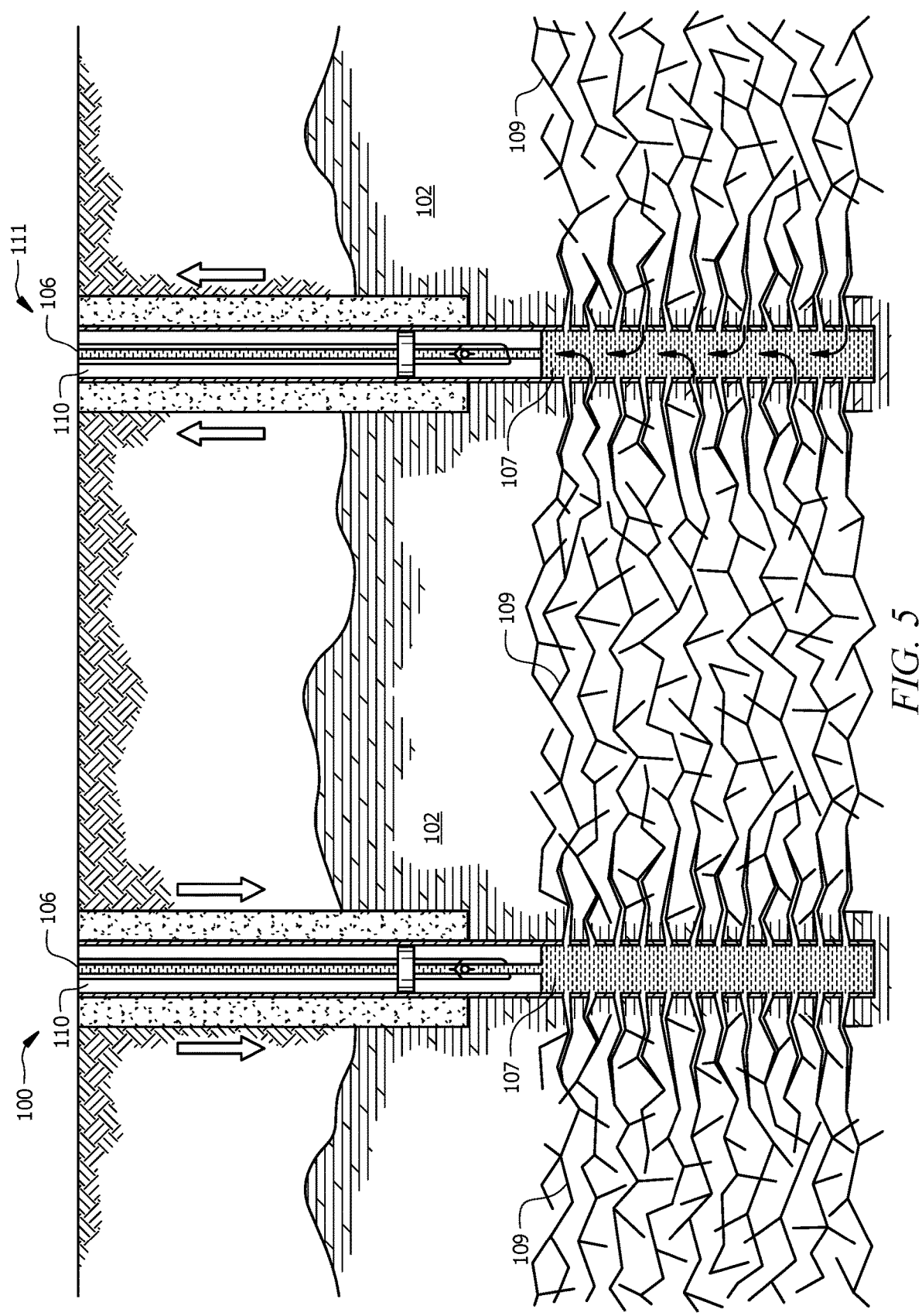
FIG. 5 is a schematic of water being injected in one embodiment.

FIG. 5 is a schematic of water being injected into the outlet portion 103. The water will pass through the perforations and into the fractures 109 created in the dry rock. The hot dry rock heats the water in the fractures 109.

It should be noted that while water is discussed as one solution which can be introduced into the well to initiate heat transfer with the hot dry rock, this is for illustrative purposes only and should not be deemed limiting. Virtually any heat transfer fluid can be introduced. Water has benefits in that it is very environmentally friendly, but there are other fluids which can act as the heat transfer fluid.

In one embodiment, and as shown, at least some of the fractures 109 are in fluid communication with an adjacent well 110. As used herein, in fluid communication with refers to a scenario whereby fluid can pass through the fractures 109 of adjacent wells. The result is water pumped down the first well 101 flows outwardly through the fractures 109 and can be retrieved from an adjacent well 110. This allows comparatively cooler water, or other liquid, to be pumped down into the first well 101, as shown in FIG. 5. The water travels through the created fractures 109 where it is heated by the hot dry rock. The water then travels toward the adjacent well 110. The heated water can then be retrieved from the adjacent well 110. The heated water can then be used as a renewable energy source. The process can repeat itself over and over again to create heat, electricity, etc.

In one embodiment, the system and method utilize at least two wells. Other numbers of wells 101 can be utilized. The fractures 109 allow the plurality of wells to be in fluid communication with one another such that a solution, such as water, can be injected into one well and retrieved from another. As noted, during that process, the solution is heated. The heat can then be used downstream for a variety of uses.

The fluid communication can be created in a variety of methods. Depending upon the formation, distance between wells, etc., one well can be fractured and the created fractures will reach the second adjacent well such that the two wells are in fluid communication. In other embodiments each well will be fractured to ensure they are in fluid communication with one another.

Thus, in one embodiment a method for harnessing geothermal energy using at least a first well and a second well is disclosed. First, an alkali metal is introduced downhole in a first well. The alkali metal can be introduced as a metal, slurry, solution, etc. A solution is introduced downhole in the first well in some embodiments. In other embodiments, the solution is already present downhole. In still other embodiments the alkali and solution are introduced simultaneously. The solution and the alkali metal react to produce an exothermic reaction.

The exothermic reaction fractures the adjacent hot rock. As noted, the hot rock can comprise various different materials, including but not limited to, granite. The fractures allow the first well to be fluidly connected to a second well. As used herein, fluidly connected refers to two or more locations being connected in such a way that a liquid can pass from one location to the next. The exothermic reaction creates fractures which allow two or more wells to be fluidly connected. This provides a mechanism by which a cool solution, such as water, can be introduced into the first well. The solution goes through the first well, into the fractures in the hot rock. As it travels, the solution becomes heated as it absorbs the heat from the hot rock. The fluid then travels to the second well where the solution is collected.

In one embodiment the solution covered from the second well has a greater temperature than the solution which is introduced into the first well. In this manner, heat can be extracted from the hot rock and utilized as discussed above.

In one embodiment the method utilizes a single well which has the ability to both inject and receive material simultaneously. One example, as discussed herein, is a single well which has an inner well 106 and an outer well 110. This provides material to be pumped down and pumped out simultaneously. As an example, a cool solution can be pumped down through the first well, where it is heated by the hot rock, and the heated solution be pumped out from the same well. Thus, while an embodiment disclosing two wells has been discussed, this is for illustrative purposes only and should not be deemed limiting.

As noted above, in one embodiment the first well has an outlet portion which extends into the hot rock. This is what allows the exothermic reaction to create fractures in the hot rock. Further, this directs the solution to the location of the fractures.

While a method of harnessing geothermal energy has been described, so too has a method of fracturing hot rock. As noted, an alkali metal is introduced downhole. A solution is then introduced. The solution reacts with the alkali metal to produce an exothermic reaction which fractures the hot rock.

The system, in one embodiment, is compact. This allows the system to be used in locations in close proximity to cities. As but one example, if hot dry rock is located near a city, either new wells can be drilled, or existing wells can be utilized, to fracture the hot dry rock. This system allows geothermal energy to be captured and utilized. Thus, in one embodiment, the system and method allows for the heat stored in hot dry rock to be captured via the introduction of a solution. Heat is transferred from the hot dry rock to the solution where it can be extracted and utilized.

This system can eliminate the need for long and expensive powerlines which transmit electrical power from a remote power plant to the desired location, such as a city. Instead, the system can reside in close proximity to the city. Put differently, the means of producing energy or electricity from the geothermal heat can be located in close proximity such that long and expensive power lines are unnecessary.

As noted, geothermal energy stores tremendous unrealized potential energy. Using an alkali metal 105 and a solution 107, the system utilizes a chemical reaction to fracture dry hot rock. With the fractures created, the system converts the hot dry rock to a large radiator. Water, or other liquid, can be pumped into the hot dry rock where it is warmed. The heated liquid is then collected and used in downstream processes to extract the energy.

While the invention has been particularly shown and described with reference to a preferred embodiment, it will be understood by those skilled in the art that various changes in form and detail may be made therein without departing from the spirit and scope of the invention.

What is claimed is:

1. A method for harnessing geothermal energy using at least a first well and a second well, said method comprising:
   a. introducing an alkali metal downhole in a first well;
   b. introducing a solution downhole in said first well, wherein said solution produces an exothermic and explosive reaction with said alkali metal, wherein said solution is introduced and kept separate from said alkali metal until said exothermic reaction is desired, wherein said alkali metal comprises an aqueous sodium solution, and wherein said aqueous sodium solution comprises ammonia;
   c. fracturing hot rock due to said exothermic reaction to produces fractures, wherein said fracturing results in said first well being fluidly connected to said second well;
   d. introducing a solution into said first well which travels through said fractures to said second well.

2. The method of claim 1 further wherein said solution of step d) comprises water.

3. The method of claim 1 further comprising the step of recovering said solution from said second well.

4. The method of claim 3 wherein said the solution recovered from said second well has a temperature, wherein said solution introduced into said first well has a temperature, and wherein the temperature of the solution recovered from the second well has a greater temperature than the solution introduced into the first well.

5. The method of claim 4 further comprising the step extracting heat from the solution recovered from the second well.

6. The method of claim 1 wherein said at least part of said first well extends into a hot rock zone.

7. The method of claim 1 wherein said hot rock comprises granite.

8. The method of claim 1 wherein said first well comprises an outlet portion, wherein said outlet portion extends into a hot rock zone.

9. The method of claim 8 wherein said outlet portion comprises perforations.

10. The method of claim 8 wherein alkali metal is deposited into said outlet portion.

11. A method for fracturing hot rock, said method comprising:
 a. introducing an alkali metal downhole in a first well;
 b. introducing a solution downhole in said first well, wherein said solution produces an exothermic and explosive reaction with said alkali metal, wherein said solution is introduced and kept separate from said alkali metal until said exothermic reaction is desired, wherein said alkali metal comprises an aqueous sodium solution, and wherein said aqueous sodium solution comprises ammonia;
 c. fracturing hot rock due to said exothermic reaction to produces fractures.

12. The method of claim 11 wherein said first well comprises an outlet portion, wherein said outlet portion extends into a hot rock zone.

13. The method of claim 12 wherein said outlet portion comprises perforations.

14. The method of claim 12 wherein alkali metal is deposited into said outlet portion.

\* \* \* \* \*